United States Patent
Lu

(10) Patent No.: US 6,732,602 B2
(45) Date of Patent: May 11, 2004

(54) DUAL-GEARSHIFT FORWARD BACKWARD CONTROL MECHANISM FOR REMOTE CONTROL TOY CAR

(76) Inventor: Ke-Way Lu, 3F, No. 322, Sec. 6, Min-Chuan E. Rd., Taipei City (TW)

(*) Notice: Subject to any disclaimer, the term of this patent is extended or adjusted under 35 U.S.C. 154(b) by 52 days.

(21) Appl. No.: 10/236,696

(22) Filed: Sep. 6, 2002

(65) Prior Publication Data

US 2004/0045385 A1 Mar. 11, 2004

(51) Int. Cl.$^7$ .............................. F16H 59/00; F16H 3/08
(52) U.S. Cl. ......................... 74/336 R; 74/373; 74/377
(58) Field of Search ............................. 74/333, 336 R, 74/323, 373, 377

(56) References Cited

U.S. PATENT DOCUMENTS

| | | |
|---|---|---|
| 745,337 A | 12/1903 | Fagerström |
| 1,059,434 A | 4/1913 | Butler .......................... 74/344 |
| 1,262,901 A | 4/1918 | Allen |
| 1,319,246 A | 10/1919 | Riedele ......................... 74/335 |
| 1,608,471 A | 11/1926 | Lascombes ................... 74/344 |
| 1,671,033 A | 5/1928 | Kimura ......................... 74/355 |
| 1,801,658 A | 4/1931 | Campbell et al. ............. 74/355 |
| 1,947,847 A | 2/1934 | Harvey ......................... 74/355 |
| 1,950,056 A | 3/1934 | Kressin ......................... 74/355 |
| 2,039,665 A | 5/1936 | Rossetter ...................... 74/376 |
| 2,149,180 A | 2/1939 | Müller .......................... 46/212 |
| 2,219,812 A * | 10/1940 | Hochstetter ............... 74/336 R |
| 2,225,174 A | 12/1940 | Keller .......................... 74/336 |
| 2,299,563 A | 10/1942 | Carlson ........................ 74/355 |
| 2,625,831 A | 1/1953 | Saunders, Jr. ................. 74/342 |
| 3,099,165 A | 7/1963 | Heth et al. .................... 74/342 |
| 3,386,406 A | 6/1968 | Tsunoda ...................... 114/144 |
| 3,479,895 A | 11/1969 | Wegener ....................... 74/355 |
| 4,173,939 A * | 11/1979 | Strang ........................... 440/75 |
| 4,323,354 A * | 4/1982 | Blanchard ..................... 440/75 |
| 4,730,505 A | 3/1988 | Sumihi ......................... 74/332 |
| 5,099,712 A * | 3/1992 | Douglass ...................... 74/363 |
| 5,305,651 A | 4/1994 | Perego ......................... 74/372 |
| 5,503,586 A | 4/1996 | Suto ............................. 446/443 |
| 5,762,532 A | 6/1998 | Ishizuka et al. .............. 446/457 |
| 5,862,705 A | 1/1999 | Lee .............................. 74/337.5 |
| 5,910,190 A | 6/1999 | Brookins ...................... 74/329 |
| 6,196,894 B1 | 3/2001 | Kennedy et al. ............. 446/461 |
| 6,367,345 B1 * | 4/2002 | Yeh .............................. 74/377 |
| 6,386,058 B1 | 5/2002 | Lu ................................ 74/332 |
| 6,413,143 B1 | 7/2002 | Lu ................................ 446/454 |
| 6,505,527 B2 * | 1/2003 | Lu ................................ 74/332 |
| 6,581,487 B1 * | 6/2003 | Lu ................................ 74/333 |
| 6,585,618 B2 * | 7/2003 | Lu ................................ 475/206 |

FOREIGN PATENT DOCUMENTS

NE         100630         3/1962

* cited by examiner

Primary Examiner—Dirk Wright
(74) Attorney, Agent, or Firm—Ladas & Parry

(57) ABSTRACT

A dual-gearshift forward backward control mechanism installed in a remote control toy car to control forward/backward motion and high/low speed gearshift by means of power transmission through a set of gears and two idle gears and the shifting of a switching gear on the polygonal middle section of the output shaft of the mechanism between two of the gears and the effect of the centrifugal force of a swivel block at one of the gears.

1 Claim, 5 Drawing Sheets

DUAL-GEARSHIFT FORWARD BACKWARD CONTROL MECHANISM FOR REMOTE CONTROL TOY CAR

BACKGROUND OF THE INVENTION

1. Field of the Invention

The present invention relates to a remote control toy car and, more particularly, to a dual-gearshift forward backward control mechanism for a remote control toy car.

2. Description of the Related Art

Regular gasoline engine remote control toy cars commonly use a transmission mechanism to increase the torque. However, because the transmission mechanism of a conventional gasoline engine remote control toy car provides only one transmission mode, it is less efficient to accelerate the speed, and the torsion cannot be increased during low speed. In order to eliminate these problems, dual-gearshift position transmission mechanisms are developed. However, prior art dual-gearshift position transmission mechanisms are commonly heavy, complicated, and expensive. Furthermore, the parts of the prior art high-precision dual-gearshift position transmission mechanisms wear quickly with use.

Further, regular gasoline engine remote control toy cars can be controlled to move forwards as well as backwards. However, the forward transmission and the backward transmission are controlled by two separated systems, i.e., when moving the toy car forwards, the user must start the forward transmission system to drive the toy car forwards; when moving the toy car backwards, the user must stop the forward transmission system and then start the backward transmission system. This forward backward transmission design is complicated, consumes much gasoline, and requires much installation space.

Like real cars, the wheels at the inner side and the wheels at the outer side have different speed of revolution when going round corners. In order to balance the speed between the wheels at the inner side and the wheels at the outer side when going round corners, a speed differential assembly shall be installed. However, because the forward transmission mechanism, the backward transmission mechanism, and the differential assembly are separated mechanisms, they cannot be installed in a common housing. Therefore, prior art gasoline remote control toy cars are commonly heavy and expensive.

SUMMARY OF THE INVENTION

The present invention has been accomplished to provide a dual-gearshift forward backward control mechanism for remote control toy car, which eliminates the aforesaid drawbacks. It is one object of the present invention to provide a dual-gearshift forward backward control mechanism for remote control toy car, which combines a two-step gearshift control mechanism and a forward backward control mechanism into a compact assembly that requires less chassis installation space. It is another object of the present invention to provide a dual-gearshift forward backward control mechanism for remote control toy car, which is inexpensive to manufacture and durable in use. To achieve these and other objects of the present invention, the dual-gearshift forward backward control mechanism for remote control toy car comprises an output shaft, the output shaft having a polygonal middle section; a switching gear mounted on the polygonal middle section of the output shaft for synchronous rotation with the output shaft and axially moved along the polygonal middle section between a first position and a second position; a first gear mounted on the output shaft, the first gear comprising an annular groove in one side thereof and a plurality of protruding blocks suspended in the annular groove; a second gear mounted on the output shaft, the second gear comprising a shoulder disposed at one side thereof and fitted into the annular groove of the first gear, an inner gear disposed in an opposite side thereof and adapted to engage the switching gear when the switching gear shifted to the first position, a swivel block pivoted to the shoulder, a spring mounted in the shoulder and supporting the swivel block in a non-operative position where the swivel block is not in engagement with the first gear, the swivel block being forced radially outwards by a centrifugal force into engagement with the protruded blocks of the first gear when the revolving speed of the second gear reached a predetermined level; a third gear mounted on the output shaft, the third gear comprising an inner gear adapted to mesh with the switching gear when the switching gear shifted to the second position; a center shaft, the center shaft having a transmission gear fixedly mounted thereon and meshed with the first gear; a first idle gear mounted on the center shaft, the first idle gear comprising a first gear portion meshed with the outer gear of the second gear and a second gear portion; a one-way axle bearing supported between the first idle gear and the center shaft; a second idle gear mounted on an axle for two-way synchronous rotation with the axle and adapted to engage the second gear portion of the first idle gear and the outer gear of the third gear; a driven gear fixedly fastened to the first gear; and an engine, the engine having a pinion fixedly provided at an output shaft thereof and meshed with the driven gear.

DETAILED DESCRIPTION OF THE PREFERRED EMBODIMENT

Figure 1:
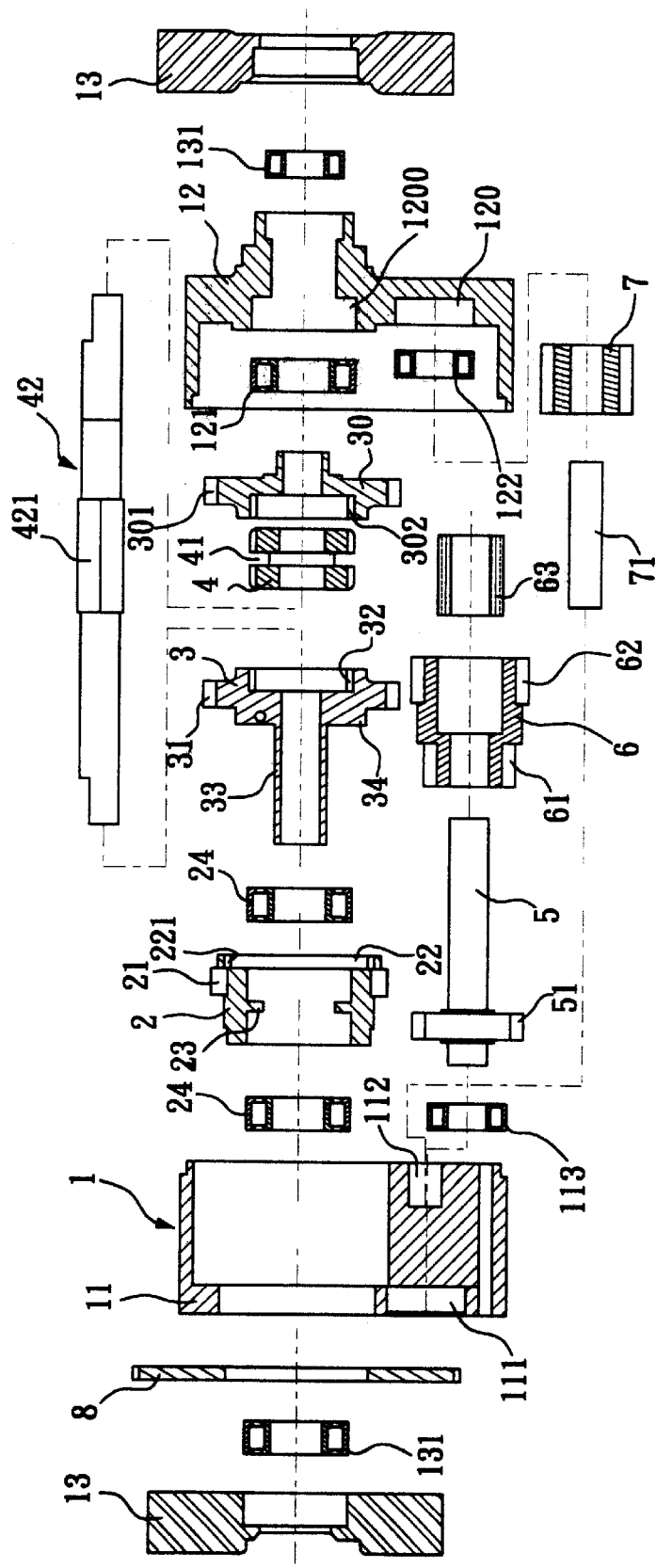
FIG. 1 is an exploded, sectional plain view of a dual-gearshift forward backward control mechanism for a remote control toy car according to the present invention.

Referring to FIG. 1, a dual-gearshift forward backward control mechanism for a remote control toy car in accordance with the present invention is generally comprised of a casing 1, a first gear 2, a second gear 3, a third gear 30, a switching gear 4, an output shaft 42, a center shaft 5, a first idle gear 6, one one-way axle bearing 63, a second idle gear 7, an axle 71, and two-way axle bearings 24, 121, 122, 131, and 113.

The casing 1 is comprised of a first shell 11 and a second shell 12. The first shell 11 comprises a bearing seat 111 and an axle hole 112. The second shell 12 comprises two bearing seats 120 and 1200.

The aforesaid output shaft 42 is for output of driving force, having a polygonal middle section 421.

The aforesaid switching gear 4 is axially slidably mounted on the polygonal middle section 421 of the output shaft 42 (the switching gear 4 has a polygonal center through hole fitting the polygonal middle section 421 of the output shaft 42), having an annular groove 41 extended around the periphery coupled to a solenoid-controlled lever 43 (see also FIG. 4) and driven by the solenoid-controlled lever 43 to move axially along the polygonal middle section 421 of the output shaft 42.

Figure 2:
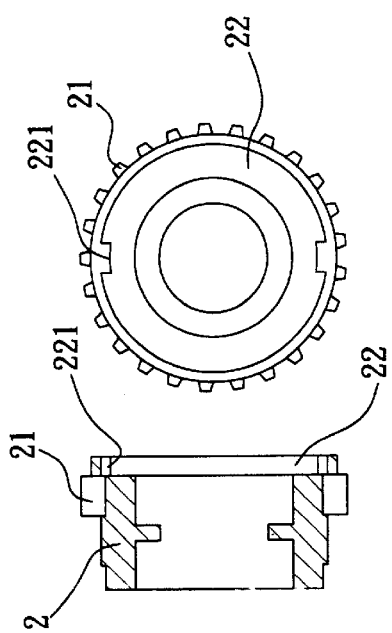
FIG. 2 is sectional front and side views of the first gear according to the present invention.

Referring to FIG. 2 and FIG. 1 again, the first gear 2 is mounted on the output shaft 42, comprising an inside annular flange 23 extended around the center through hole thereof on the middle and adapted to separate the two two-way axle bearings 24 that support the first gear 2 on the output shaft 42 in the first shell 11, an annular groove 22 in one end around the center through hole, and a plurality of protruding blocks 221 suspended in the annular groove 22. Further, a driven gear 8 is fastened to the first gear 2.

Figure 3:
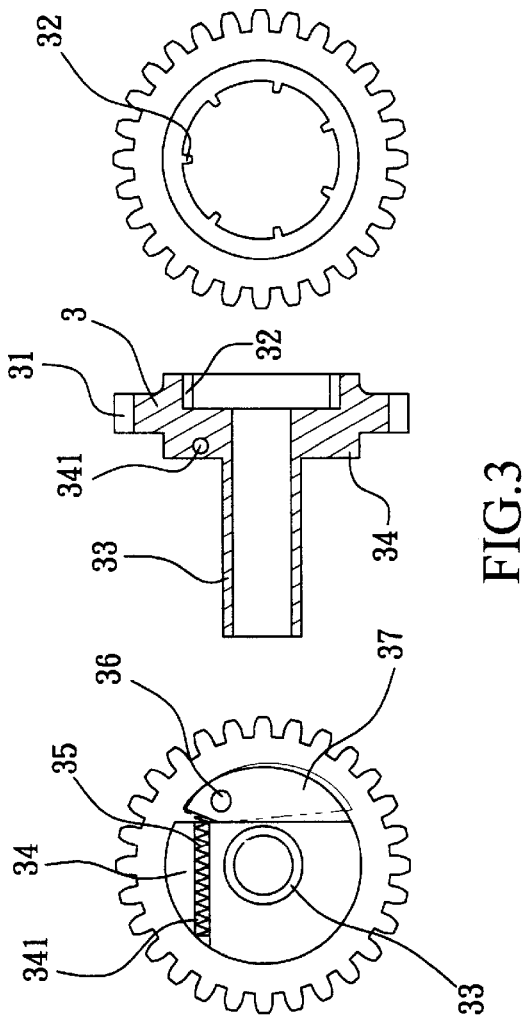
FIG. 3 is sectional front, left and right side views of the second gear according to the present invention.

Referring to FIG. 3 and FIG. 1 again, the second gear 3 is mounted on the output shaft 42, comprising an axially extended center tube 33, a shoulder 34 extended around the center tube 33 at one side and fitting the annular groove 22 of the first gear 2, an inner gear 32 disposed at an opposite side and adapted to engage the switching gear 4, an outer gear 31, a recessed hole 341 formed in the shoulder 34, a spring 35 mounted in the recessed hole 341, and a swivel block 37 eccentrically pivoted to the shoulder 34 by a pivot 36. The swivel block 37 has one end supported on one end of the spring 35. Normally, the other end of the swivel block 37 is maintained within the cover area of the shoulder 34. However, when the second gear 3 rotated, the swivel block 37 is forced radially outwards by the centrifugal force.

The aforesaid third gear 30 is mounted on the output shaft 42, comprising an inner gear 302 adapted to engage the switching gear 4, and an outer gear 301.

The aforesaid center shaft 5 is fixedly mounted with a transmission gear 51.

The aforesaid first idle gear 6 is mounted on the one-way axle bearing 63 at the center shaft 5 for rotation in one direction, having a first peripheral gear portion 61 and a second peripheral gear portion 62.

The aforesaid second idle gear 7 is mounted on an axle 71 in the casing 1 for two-way rotation with the axle 71.

Referring to FIGS. from 1 through 4 again, by means of the output shaft 42, the first gear 2, the second gear 3, the switching gear 4 and the third gear 30 are connected together. At this time, the switching gear 4 is positioned in the polygonal middle section 421 of the output shaft 42 between the second gear 3; the third gear 30 and the center tube 33 of the second gear 3 is inserted into the center hole of the first gear 2; the shoulder 34 of the second gear 3 is engaged into the annular groove 22 of the first gear 2; the first gear 2 is supported on two-way axle bearings 24 around the center tube 33 of the second gear 3 for free rotation in two directions; the driven gear 8 is meshed with a pinion 91 at the output shaft of an engine 9. Further, the third gear 30 is supported in a two-way axle bearing 121 in the second shell 12 for free rotation relative to the second shell 12. The two distal ends of the output shaft 42 are respectively extended out of the first shell 1 and the second shell 12 and supported in a respective two-way axle bearing 131 in a respective mounting block 13 and then respectively coupled to the rear wheel system and front wheel system of the remote control toy car. The mounting block 13 is fixedly fastened to the frame of the remote control toy car (not shown).

Figure 4:
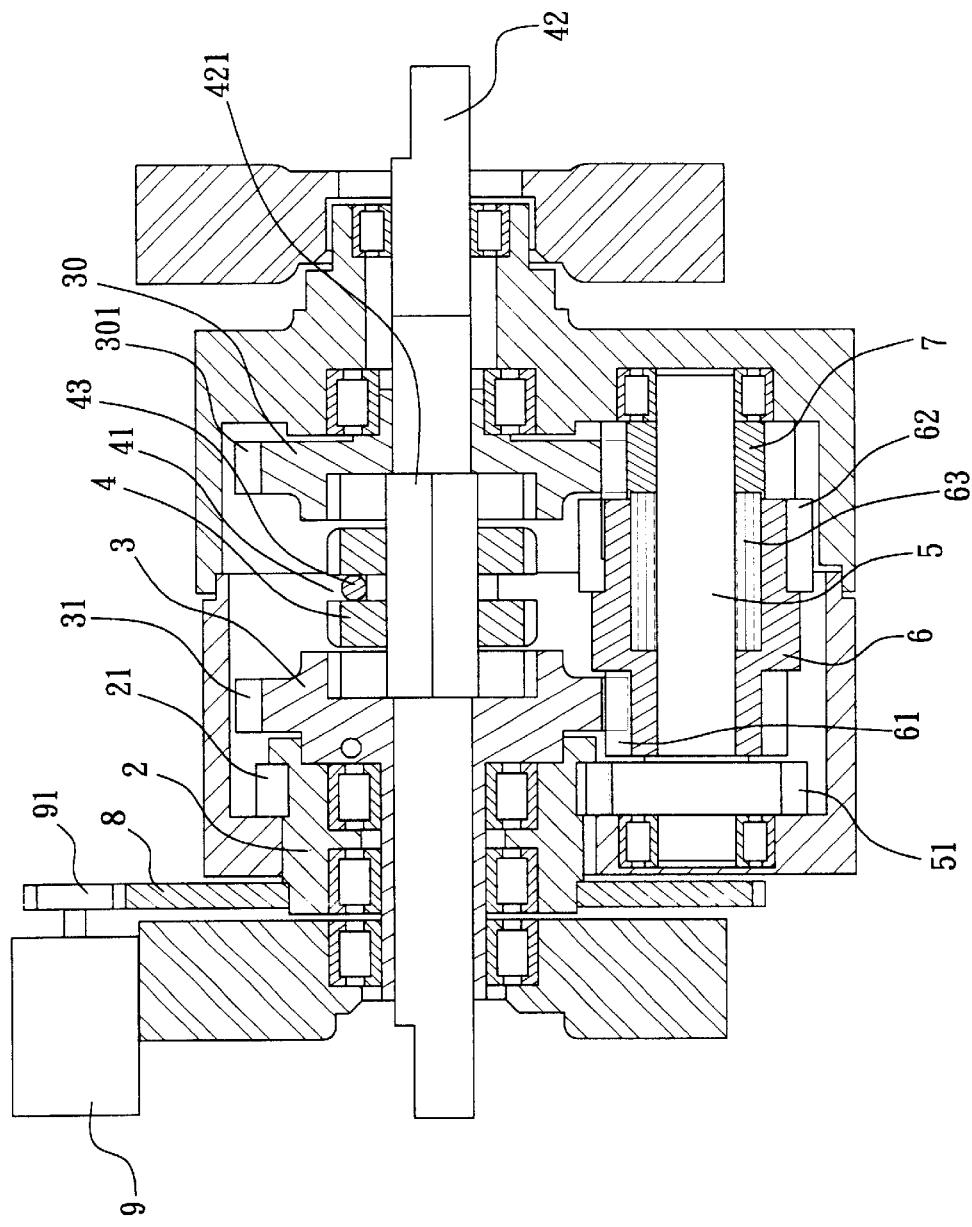
FIG. 4 is a sectional assembly view of the dual-gearshift forward backward control mechanism, showing the switching gear disengaged from the second gear and the third gear.

The center shaft 5 has one end supported in one two-way axle bearing 113 in the bearing seat 11 of the first shell 11, and the other end coupled to the first idle gear 6. The one-way axle bearing 63 is supported between the outer diameter of the center shaft 5 and the inner diameter of the first idle gear 6 so that the first idle gear 6 can only be rotated in one direction. The transmission gear 51 is meshed with the teeth 21 of the first gear 2. The first gear portion 61 of the first idle gear 6 is meshed with the outer gear 31 of the second gear 3. The second gear portion 62 of the first idle gear 6 is meshed with the outer gear 301 of the third gear 30. When inserted through the second idle gear 7, the axle 71 has one end supported in the axle hole 112 of the first shell 11 and the other end supported in one two-way axle bearing 122 in one bearing seat 120 of the second shell 12, keeping the second idle gear 7 meshed with the outer gear 301 of the third gear 30 and the second gear portion 62 of the first idle gear 6. FIG. 4 shows the dual-gearshift forward backward control mechanism well assembled.

Referring to FIG. 4 again, when the engine 9 initially started, the pinion 91 drives the driven gear 8 and the first gear 2 to rotate synchronously. Because the teeth 21 of the first gear 2 are meshed with the transmission gear 51 of the center shaft 5 and the one-way axle bearing 53 couples the center shaft 5 to the first idle gear 6, the first idle gear 6 is rotated upon rotary motion of the first gear 2. During rotary motion of the first idle gear 6, the first gear portion 61 drives the second gear 3 to rotate on the output shaft 42. Further, because the second idle gear 7 is meshed with the second gear portion 62 of the first idle gear 6 and the outer gear 301 of the third gear 30, the rotation of the first idle gear 6 causes the second idle gear 7 to rotate the third gear 30 in direction reversed to the third gear 30 (the second gear 3 is rotated clockwise, and the third gear 30 is rotated counter-clockwise).

Figure 5:
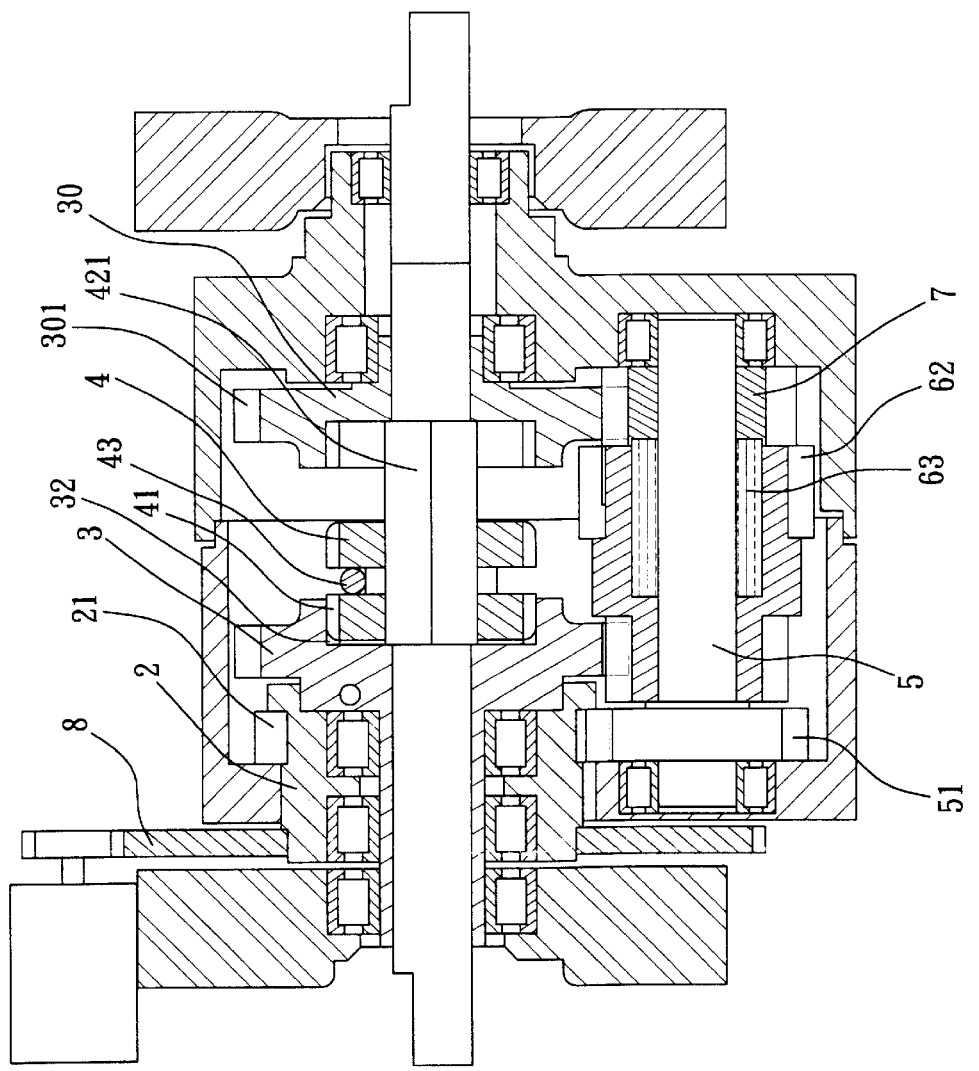
FIG. 5 is similar to FIG. 4 but showing the switching gear shifted into engagement with the second gear.
Figure 6:
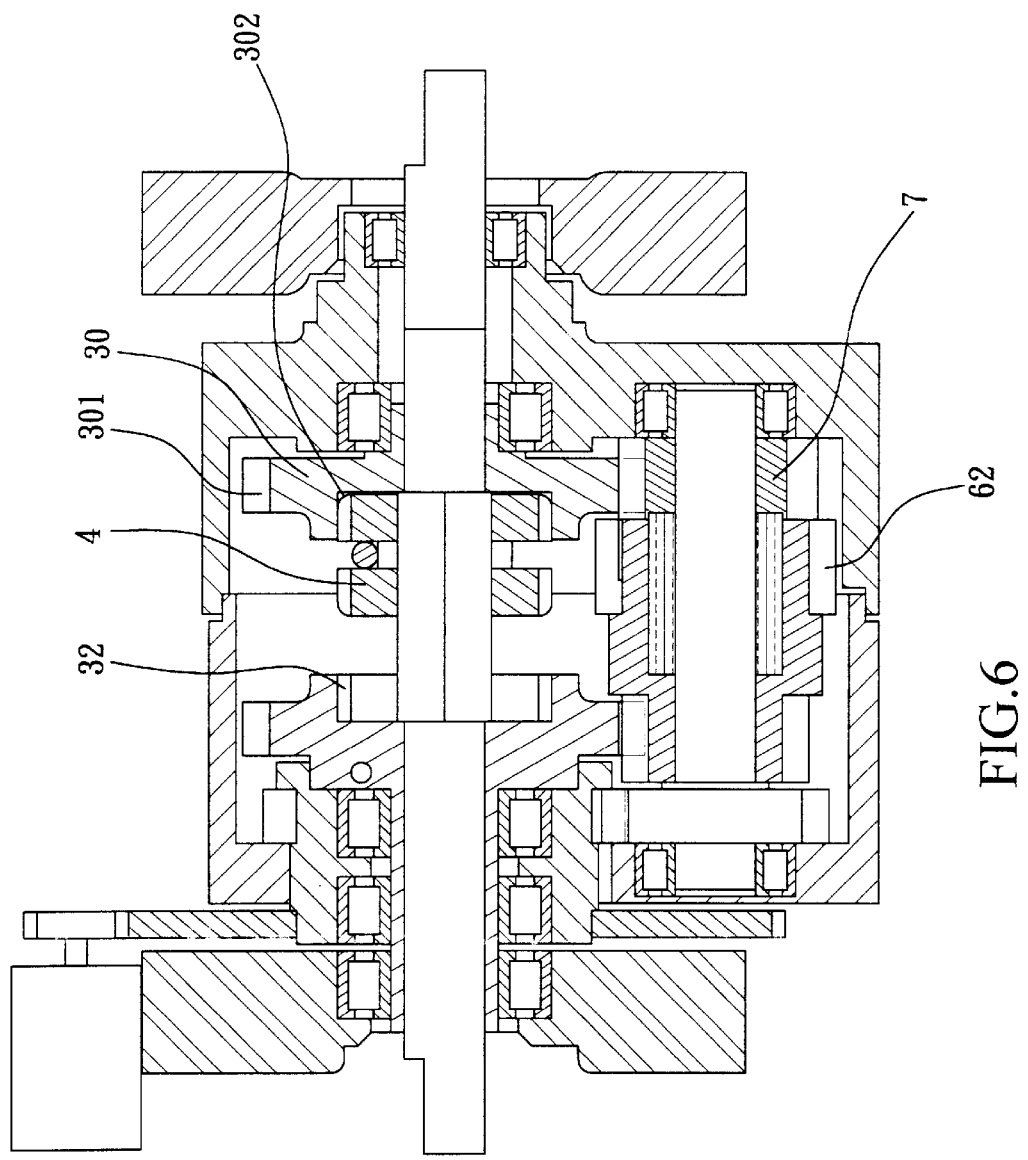
FIG. 6 is similar to FIG. 4 but showing the switching gear shifted into engagement with the third gear.

FIG. 4 shows the lever 43 moved the switching gear 4 to a mid position between the second gear 3 and the third gear 30 without engaging any gear. At this time, the second gear 3 and the third gear 30 run idle. When the switching gear 4 moved leftwards and forced into engagement with the inner gear 32 of the second gear 3, the second gear 3 drives the switching gear 4 to rotate the output shaft 42 in clockwise direction (see FIG. 5). On the contrary, when the switching gear 4 moved rightwards and forced into engagement with the inner gear 302 of the third gear 30, the third gear 30 drives the switching gear 4 to rotate the output shaft 42 in counter-clockwise direction (see FIG. 6).

When the engine 9 accelerated and the revolving speed of the second gear 3 reached a predetermined level, the swivel block 37 is forced by the centrifugal force to conquer the spring power of the spring 35 and to fly radially outwards to the outside of the shoulder 34 (see FIG. 3) into engagement with the protruding blocks 221 of the first gear 2. thereby causing the first gear 2 and the second gear 3 connected together to transfer rotary driving force directly from the engine 9 to the output shaft 42, and therefore the revolving speed of the output shaft 42 is greatly accelerated. When the output power of the engine 9 lowered and the revolving speed of the second gear 3 dropped below the predetermined level, the spring power of the spring 35 surpasses the centrifugal force again, and the swivel block 37 is disengaged from the protruding blocks 221 of the first gear 2 and returned to its former position, enabling the output power of the engine 9 to be transferred to the output shaft 42 through the first gear 2, the transmission gear 51 and the first idle gear 6, and therefore the revolving speed of the output shaft 42 is relatively reduced and the output torque of the output shaft 42 is relatively increased. By means of the aforesaid operation, the dual-gearshift forward backward control mechanism achieves a two-gearshift auto shifting control.

A prototype of dual-gearshift forward backward control mechanism for remote control toy car has been constructed with the features of FIGS. 1~6. The dual-gearshift forward backward control mechanism for remote control toy car functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A dual-gearshift forward backward control mechanism installed in a remote control toy car and coupled to the engine of the remote control toy car for controlling the operation of the remote control toy car by a remote controller, comprising:

an output shaft, said output shaft having a polygonal middle section;

a switching gear mounted on said polygonal middle section of said output shaft for synchronous rotation with said output shaft and axially moved along said polygonal middle section between a first position and a second position;

a first gear mounted on said output shaft, said first gear comprising an annular groove in one side thereof and a plurality of protruding blocks suspended in the annular groove;

a second gear mounted on said output shaft, said second gear comprising a shoulder disposed at one side thereof and fitted into the annular groove of said first gear, an inner gear disposed in an opposite side thereof and adapted to engage said switching gear when said switching gear shifted to said first position, a swivel block pivoted to said shoulder, a spring mounted in said shoulder and supporting said swivel block in a non-operative position where said swivel block is not in engagement with said first gear, said swivel block being forced radially outwards by a centrifugal force into engagement with the protruded blocks of said first gear when the revolving speed of said second gear reached a predetermined level;

a third gear mounted on said output shaft, said third gear comprising an inner gear adapted to mesh with said switching gear when said switching gear shifted to said second position;

a center shaft, said center shaft having a transmission gear fixedly mounted thereon and meshed with said first gear;

a first idle gear mounted on said center shaft, said first idle gear comprising a first gear portion meshed with the outer gear of said second gear and a second gear portion;

a one-way axle bearing supported between said first idle gear and said center shaft;

a second idle gear mounted on an axle for two-way synchronous rotation with said axle and adapted to engage the second gear portion of said first idle gear and the outer gear of said third gear;

a driven gear fixedly fastened to said first gear; and an engine, said engine having a pinion fixedly provided at an output shaft thereof and meshed with said driven gear.

* * * * *